United States Patent [19]
Johnston

[11] Patent Number: 5,376,293
[45] Date of Patent: Dec. 27, 1994

[54] DEICER

[75] Inventor: Daniel P. Johnston, Pierre, S. Dak.

[73] Assignee: State of South Dakota as represented by the Department of Transportation, Pierre, S. Dak.

[21] Appl. No.: 118,873

[22] Filed: Sep. 9, 1993

Related U.S. Application Data

[63] Continuation-in-part of Ser. No. 944,476, Sep. 14, 1992, abandoned.

[51] Int. Cl.$^5$ ............................................. C09K 3/18
[52] U.S. Cl. ............................. 252/70; 252/76; 252/79; 106/13; 562/607; 562/609
[58] Field of Search .............. 252/70, 76, 79; 106/13; 562/607, 609

[56] References Cited

U.S. PATENT DOCUMENTS

| | | | |
|---|---|---|---|
| 3,057,731 | 10/1962 | Froman | 426/549 |
| 4,377,488 | 3/1983 | Gancy | 252/70 |
| 4,448,702 | 5/1984 | Kaes | 106/13 |
| 4,562,284 | 12/1985 | Drent | 562/406 |
| 4,664,832 | 5/1987 | Sandvig et al. | 252/70 |
| 4,855,071 | 8/1989 | Todd, Jr. et al. | 252/70 |

OTHER PUBLICATIONS

Palmer, *Transportation Research Record* 1127, 1987 (published by Amoco Chemicals Company, P.O. Box 400, Naperville, Ill. 60566) no month.

*Primary Examiner*—Karl Group
*Assistant Examiner*—C. M. Bonnar
*Attorney, Agent, or Firm*—Fitch, Even, Tabin & Flannery

[57] ABSTRACT

Improved deicer compositions containing crystalline double salts formed from mixtures of relatively low molecular weight carboxylic acids (for example, mixtures of formic acid and acetic acid) are provided. The deicer compositions are generally prepared by neutralizing an aqueous mixture containing at least two carboxylic acids or salts thereof, adjusting the pH to between about 7 and about 10, and drying the aqueous mixture to obtain a double salt crystalline product. Double salts containing sodium cations and double salts containing sodium cations and at least one cation selected from the group consisting of potassium, calcium, and magnesium provide effective deicing compositions which are environmentally safer than conventional deicing compositions.

46 Claims, No Drawings

DEICER

This application is a continuation-in-part of U.S. patent application Ser. No. 07/944,476, filed Sep. 14, 1992, now abandoned.

FIELD OF THE INVENTION

The invention generally relates to the field of deicing compositions. More specifically, this invention relates to deicing compositions and methods of deicing roadways and like structures which are less corrosive to both the infrastructure and vehicles and are less damaging environmentally. The deicing compositions of this invention can also act as effective anti-icing agents by significantly reducing the bond strength between roadways and like structures and later accumulating ice and snow. In one embodiment, the compositions of this invention are typically made by neutralizing an aqueous mixture of at least two low molecular weight carboxylic acids or salts thereof with sodium carbonate or sodium hydroxide, wherein the final pH is adjusted to from about 7 to about 10, and removing the water to obtain a sodium double salt. In another embodiment, the compositions of this invention are prepared by neutralizing an aqueous mixture of at least two low molecular weight carboxylic acids or salts thereof with a mixture of sodium carbonate or sodium hydroxide and at least one compound selected from the group consisting of potassium carbonate, potassium hydroxide, magnesium carbonate, magnesium hydroxide, calcium carbonate and calcium hydroxide, wherein the final pH is adjusted to from about 7 to about 10, and removing the water to obtain a mixed cation double salt. The deicing compositions of this invention are the crystalline products comprising the sodium double salts and the mixed cation double salts that are obtained.

BACKGROUND OF THE INVENTION

Sodium chloride and alkali metal salts such as calcium chloride are used extensively and in large quantities on roads for melting snow and ice. These agents work well in deicing applications, but have several drawbacks. For example, salt is a leading cause of structural corrosion of the nation's bridges and highway structures and spalling of concrete. Salt also causes severe vehicle corrosion and is also harsh on the environment. Thus, it would be highly desirable to develop an alternative deicer composition that is readily biodegradable at relatively cold temperatures, has considerably less residual impact on structural corrosion of the nation's highways and bridges, causes less spalling of concrete, and is less harsh to the environment.

Calcium magnesium acetate (hereafter CMA) has been tried as one alternative deicer. Unfortunately, CMA spontaneously generates free acetic acid, even at pH values as high as 9, via the hydrolysis of the acetates group by an alkaline reaction. CMA is also very dusty; thus, personnel handling CMA should wear appropriate masks. Also, the exposure of personnel to acetic acid fumes is quite undesirable. Another problem with CMA is that it draws frost due to its hygroscopic nature; thus, areas that normally would tend to dry out during daylight hours remain wet and may refreeze during colder nighttime temperatures. Therefore, CMA is not a preferred or generally acceptable alternative to sodium chloride as a deicing composition. Sodium acetate, another potential deicer, also undergoes hydrolysis to release free acetic acid.

Another composition which has been used as a deicer composition is disclosed in Sandvig et al., U.S. Pat. No. 4,664,832. This patent discloses a deicer composition manufactured by reacting sodium carbonate with sawdust or other lignocellulose biomass at elevated temperatures. The manufacture of the composition of this patent generally requires high temperatures and pressures and the evaporation of large volumes of water. The resulting mixture, which contains sodium salts of acetic, formic, glycolic, and lactic acids, has an acceptable freezing point depression, but has limited ice penetration capability. Ice penetration using this composition ranges from between about 0 to about 66 percent of the values obtained with sodium chloride under similar test conditions. The Sandvig et al. composition is not, therefore, as effective a deicer as sodium chloride. Furthermore, these deicing compositions can vary considerably in both specific composition and effectiveness due to inherent compositional differences and variations in the biomass feedstock.

Palmer, *Transportation Research Record* 1127, 1987 (published by Amoco Chemicals Company, P.O. Box 400, Naperville, Ill. 60566) indicated that sodium formate should be investigated as a potential deicer and that it could be a better alternative to CMA. Sodium formate has a freezing-point curve similar to sodium chloride down to about $-14°$ C. Sodium formate was reported to be of particular interest because it potentially could be applied in solution form in the airline industry as a deicer for both planes and runways. But sodium formate is not as effective as sodium chloride as a deicer and is corrosive.

It would be desirable, therefore, to provide deicing compositions that are relatively inexpensive, that do not have a high corrosive potential or spalling effect, that are environmentally friendly, that are essentially non-dusty, and that have substantial freezing point depressions and good ice penetration characteristics. The compositions and methods of this invention generally provide such characteristics.

SUMMARY OF THE INVENTION

The present invention relates to deicing compositions which are highly effective as road deicers and anti-icers and have reduced corrosive effects. The present compositions do not release or provide chloride ions to the environment. These deicing compositions can be easily handled without generating dust, are nontoxic, and have excellent ice penetration capabilities. These deicing compositions also have excellent anti-icing properties.

In one embodiment, the deicing compositions are prepared by initially neutralizing an aqueous mixture of at least two low molecular weight carboxylic acids or salts thereof with either sodium carbonate or sodium hydroxide. The pH of the mixture is adjusted further, if necessary, to a final pH of between about 7 and about 10, preferably about 9. The mixture is dried and a sodium double salt crystalline product is recovered. In another embodiment, the deicing compositions are prepared by initially neutralizing an aqueous mixture of at least two low molecular weight carboxylic acids or salts thereof with a mixture containing either sodium carbonate or sodium hydroxide and a compound selected from the group consisting of potassium carbonate, potassium hydroxide, magnesium carbonate, magnesium hydroxide, calcium carbonate and calcium hydroxide. The pH of the mixture is adjusted further, if necessary, to a final pH of between about 7 and about 10, preferably about 9. The mixture is dried and a mixed cation double salt crystalline product is recovered.

The carboxylic acids used in this invention have molecular weights of between about 46 to about 90. Typically, carboxylic acids used to prepare the deicing compositions have between about 1 to about 3 carbon atoms. The carboxylic acids are preferably selected from the group consisting of acetic, formic, glycolic and lactic acids.

One preferred composition comprises, and preferably consists essentially of, the sodium double salts. Another preferred composition comprises, and preferably consists essentially of, the mixed cation double salts where one cation is sodium and the other cation is selected from the group consisting of potassium, calcium, magnesium, and mixtures thereof. More preferred compositions of the present invention are the sodium double salts and the mixed cation double salts prepared using mixtures of acetic acid and formic acid.

The molar ratios of the carboxylic acids in the mixtures to be neutralized are generally between about 6:1 and about 1:6. One mixture of carboxylic acids which is highly effective and preferred comprises acetic acid and formic acid. Preferably, the molar ratio of acetic acid to formic acid in the mixture is in the range of between about 4:1 to about 1:4, more preferably about 2:1 to about 1:2, most preferably about 1:1.

Upon neutralization with a sodium-based neutralization agent or a mixture of a sodium-based neutralization agent with a potassium-based neutralization agent, a calcium-based neutralization agent, and/or a magnesium-based neutralization agent and subsequent removal of water, a double salt crystal (i.e., a sodium double salt or a mixed cation double salt) is formed which has been found to be a highly effective deicer when used in the crystal form or in aqueous solution.

The deicing compositions of the invention provide an environmentally preferable alternative to sodium chloride for deicing roads, highways, bridges, sidewalks, and the like as well as other deicing applications. Preferably, sodium salts or mixed sodium salts of the mixtures of carboxylic acids are prepared. The sodium-containing carboxylic deicers will, of course, introduce sodium ions into the environment, as does sodium chloride. The amount of sodium introduced into the environment can be significantly reduced by using the mixed cation double salt compositions of this invention. Furthermore, and as compared to sodium chloride, the deicer compositions of the invention are a relatively innocuous threat to the environment and are generally similar to CMA with regard to effects upon the environment.

DETAILED DESCRIPTION OF THE INVENTION

The compositions of the invention are prepared by neutralizing to a pH of about 7 an aqueous solution of at least two low molecular weight carboxylic acids or salts thereof with an neutralization agent. Preferred neutralization agents include sodium carbonate, sodium hydroxide, and mixtures containing either sodium carbonate or sodium hydroxide and at least one compound selected from the group consisting of potassium carbonate, potassium hydroxide, magnesium carbonate, magnesium hydroxide, calcium carbonate, and calcium hydroxide. The pH of the neutralized solution is adjusted further, if necessary, to a final pH of between about 7 and about 10. The solution is dried and a crystalline product is recovered.

While the composition of the invention is preferably prepared by neutralizing an aqueous solution containing at least two low molecular weight carboxylic acids or salts thereof with the Just noted sodium-based, potassium-based, magnesium-based, and calcium based neutralization agents, other neutralizing agents can be used if desired. Examples of such additional neutralization agents include $Na_2CO_3.NaHCO_3.2H_2O$, $NaHCO_3$, $KHCO_3$, dolomite (i.e., $CaCO_3.MgCO_3$), and the like. By "neutralizing" is meant that the pH of the mixture of carboxylic acids or salts is adjusted to a pH of between about 7 and about 10. When a carbonate neutralizing agent is used, the molar ratio of the added carbonate compound to the carboxylic acids is usually between about 0.4:1 to about 0.6:1. When a hydroxide neutralizing agent is used, the molar ratio of the added hydroxide compound to the carboxylic acids is usually between about 0.9:1 to about 1.0:1. By "aqueous solution of low molecular weight carboxylic acids" it is meant that the solution comprises between about 10 and about 60 weight percent, and preferably between about 20 and about 30 weight percent, of at least two organic carboxylic acids. The water can be first added to the neutralizing agent before adding to the carboxylic acids or salts thereof. Or, an aqueous mixture can be prepared by admixing between about 0.1 to about 0.3, or about 0.1 to about 0.2, molar amount of carboxylic acid with about 0.5 to about 2.0 molar amount of water. Generally, the preferred method of mixing the ingredients is to separately add water to the neutralizing agent and to the carboxylic acids in an amount sufficient to ionize the ions and then to combine the aqueous neutralizing agent and aqueous carboxylic acid.

The pH of the aqueous solution, after neutralizing, is further adjusted, if necessary, to a final pH of between about 7 and about 10 with a pH adjusting agent, preferably using the same base or one of the bases used in the initial neutralization. One especially preferred pH adjusting agent is sodium hydroxide. The final pH is preferably adjusted to about 9. A double salt is formed from the aqueous solution which can be collected in crystalline form by removal of the water. The double salts of this invention provide unexpected deicing properties which are significantly improved over the carboxylic acids or other salts alone or when combined without crystal formation in aqueous solution. In other words, it has been found that the unique properties of the invention result from the formation of a double salt. The aqueous mixture can be dried to recover the desired double salts (i.e., the sodium double salts or the mixed cation double salts) using conventional drying techniques, including, for example, rotary evaporation, thermal evaporation, and the like.

The low molecular weight carboxylic acids used to prepare the deicing composition of this invention have a molecular weight of between about 46 to about 90, preferably about 46 to about 60. Typically the carboxylic acids used to prepare the deicing composition have 1 to 3 carbon atoms, and preferably 1 or 2 carbon atoms. Salts of these carboxylic acids may also be used; in such case, the sodium salts are generally preferred. The carboxylic acids preferably used are acetic, formic, glycolic, and lactic acid or the salts thereof. Preferably mixtures of acetic acid and formic acid are used to prepare the compositions of this invention.

Mixtures of at least two of these carboxylic acids or salts thereof are used to prepare the deicing compositions of this invention. Generally the two carboxylic acids or salts thereof are combined in a molar ratio of between about 6:1 to about 1:6. Preferably, the molar ratio of two carboxylic acids or salts thereof is in the range of about 4:1 to about 1:4, more preferably about 2:1 to about 1:2, and most preferably about 1:1 ratio.

For commercial practicality, the carboxylic acid double salts of this invention should contain a sodium cation. These include the sodium double salts and the mixed cation double salts which include, in addition to the sodium cation, one or more cations selected from the groups consisting of potassium, calcium, and magnesium.

The formation of the crystalline double salts of this invention is generally carried out at a temperature of between about 25° and 100° C. Generally, crystalline double salts with an average particle size of between about 1 to 12.5 mm, and preferably between about 2 to 9 mm, are acceptable for use as deicers.

Generally, the deicer compositions of the present invention have an eutectic temperature of between about −40° to about −22.0° C. In some case, the eutectic temperature will be between about −40° to about −25° C. or between about −27° to about −24° C. The ice penetration of the compositions of the present invention is generally between about i to about 4 millimeters, and preferably between about 3 to about 4 millimeters, in about 0.4 hours.

The resulting deicing sodium double salt compositions, formed from equal molar amounts of acetic acid and formic acid neutralized with sodium-containing bases, can be generally represented by the following formula:

$$Na^+(HCOO^-)Na^+(CH_3COO^-).n(H_2O),$$

where n equals 0 to 5. The resulting deicing mixed cation double salt compositions, formed from equal molar amounts of acetic acid and formic acid neutralized with equal molar amounts of sodium-containing and potassium-containing neutralization agents, can be generally represented by the following formula:

$$Na^+(HCOO^-)Na^+(CH_3COO^-)K^+(HCOO^-)K^+(CH_3COO^-).n(H_2O),$$

where n equals 0 to 5. The resulting deicing mixed cation double salt compositions, formed from equal molar amounts of acetic acid and formic acid neutralized with equal molar amounts of sodium-containing and calcium-containing neutralization agents, can be generally represented by the following formula:

$$Na^+(HCOO^-)Na^+(CH_3COO^-)Ca^{+2}(HCOO^-)_2Ca^{+2}(CH_3COO^-)_2.n(H_2O),$$

where n equals 0 to 5. The resulting deicing mixed cation double salt compositions, formed from equal molar amounts of acetic acid and formic acid neutralized with equal molar amounts of sodium-containing and magnesium-containing neutralization agents, can be generally represented by the following formula:

$$Na^+(HCOO^-)Na^+(CH_3COO^-)Mg^{+2}(HCOO^-)_2Mg^{+2}(CH_3COO^-)_2.n(H_2O),$$

where n equals 0 to 5.

The following examples are intended to further illustrate the invention and not to limit it. In the examples, acetate is usually abbreviated with "A" and formate with "F"; thus, for example, sodium acetate and sodium formate are abbreviated as NaA and NaF, respectively. Unless noted otherwise, all ratios in the examples are molar ratios.

Example 1. This example is divided into three parts. Part A describes the preparation of several sodium double salts derived using different molar ratios of acetic acid and formic acid. Part B tests the ice penetration properties of the various compositions of Part A. And Part C provides eutectic temperature data for the various compositions of part A.

Part A. The compositions that were tested in Parts B and C of this example were prepared using the following formulations and procedures:

| Composition 1 | Composition 2 |
|---|---|
| (4:1 NaA:NaF) | (3:1 NaA:NaF) |
| 5.0494 g NaOH | 5.0955 g NaOH |
| 6.0640 g CH$_3$COOH (glacial) | 5.7325 g CH$_3$COOH (glacial) |
| 1.2950 g HCOOH (89.7%) | 1.6332 g HCOOH (89.7%) |
| Composition 3 | Composition 4 |
| (2:1 NaA:NaF) | (1:1 NaA:NaF) |
| 5.1716 g NaOH | 5.3324 g NaOH |
| 5.1754 g CH$_3$COOH (glacial) | 3.9988 g CH$_3$COOH (glacial) |
| 2.2105 g HCOOH (89.7%) | 1.7094 g HCOOH (89.7%) |
| Composition 5 | Composition 6 |
| (1:2 NaA:NaF) | (1:3 Na.A:NaF) |
| 5.5042 g NaOH | 5.5944 g NaOH |
| 2.7538 g CH$_3$COOH (glacial) | 2.0979 g CH$_3$COOH (glacial) |
| 4.7048 g HCOOH (89.7%) | 5.3792 g HCOOH (89.7%) |
| Composition 7 | Composition A |
| (1:4 NaA:NaF) | (NaCl) |
| 5.6494 g NaOH | 0.75 g NaCl |
| 1.6958 g CH$_3$COOH (glacial) | |
| 5.7944 g HCOOH (89.7%) | |

The components of each composition were weighed in separate beakers. Between about 5 ml to about 10 ml of water was used to dissolve the NaOH. CH$_3$COOH (acetic acid) and HCOOH (formic acid) were added to the NaOH solution with about 20 ml of water to neutralize to a pH of 7. The pH of the mixture was then adjusted to 9 by stirring in a few drops of 1N NaOH. The crystals were formed at a temperature of about 25° C. The solids content of the solutions was between about 20 and about 40 weight percent. Each composition was dried using a rotary evaporator using a temperature of about 90° C. These compositions were tested below for freezing and ice penetration properties.

Part B. Distilled water (30 ml) was added to each of ten petri dishes and frozen in an upright freezer overnight. At the same time, three crystals (about 0.25 g each) of each deicing composition of Part A were equilibrated in the same freezer. The freezer temperature was −25° C. (about −13° F.). The crystals of each deicing composition were placed on the ice surface in the petri dishes as rapidly as possible in the freezer.

The temperature inside the freezer was monitored to determine the effect the ambient air might have had on the test. In all cases, the samples were exposed to the same environmental conditions during the test. The temperature at the beginning of the test was 19.8° C. (about −3.6° F.). After 23 minutes, the temperature in the freezer dropped to −24° C. (about −11.7° F.).

The average ice penetration and liquid water content were measured for each sample and are included in Table I below:

TABLE I

| No. | Composition | Ice Penetration (mm) | Liquid Water (g) |
|---|---|---|---|
| 1 | 4:1 NaA:NaF | 1.32 | Trace |
| 2 | 3:1 NaA:NaF | 2.12 | Trace |
| 3 | 2:1 NaA:NaF | 2.91 | 0.629 |
| 4 | 1:1 NaA:NaF | 3.70 | 0.749 |
| 5 | 1:2 NaA:NaF | 2.91 | Trace |
| 6 | 1:3 NaA:NaF | 2.91 | Trace |
| 7 | 1:4 NaA:NaF | 2.65 | 0.426 |
| *A | NaCl | 1.59 | 0.167 |

*A - comparison

Table I above clearly illustrates the deicing effectiveness of the NaA:NaF mixtures as compared to NaCl. Moreover, this data clearly illustrates the excellent deicing performance of the sodium double salts prepared from acetic acid and formic acid mixtures having molar ratios between about 2:1 to 1:2 and the superior deicing performance of the sodium double salts prepared from a 1:1 molar ratio of acetic acid and formic acid.

Part C. The eutectic temperatures of the compositions prepared in Part A, as well as the following comparative compositions, were determined. The comparative compositions included: (1) Comparison B—distilled water; Comparison C—sodium acetate (NaA); and Comparison D—sodium formate (NaF).

The eutectic temperatures were determined by placing about 10 ml of a 50% saturated solution of each composition into a stirred cell which was then placed into an evacuated chamber and connected to a Dewar containing liquid nitrogen by a copper rod. A time-temperature curve (i.e., a cooling curve) was obtained for each composition. The eutectic temperature was determined from the cooling curve for each composition and is presented in Table II below.

TABLE 11

| Composition | Type | Eutectic Temp. °C. |
|---|---|---|
| 1 4:1 NaA:NaF pH 9 | Aqueous | −38.5 |
| 3 2:1 NaA:NaF pH 9 | Aqueous | −27.3 |
| 4 1:1 NaA:NaF pH 9 | Aqueous | −22.3 |
| 5 1:2 NaA:NaF pH 9 | Aqueous | −24.1 |
| 7 1:4 N&A:NAF pH 9 | Aqueous | −25.2 |
| Comparison A (NaCl) | Aqueous | −21.3 |
| Comparison B (H$_2$O) |  | 0.0 |
| Comparison C (NaA) | Aqueous | −20.5 |
| Comparison D (NaF) | Aqueous | −16.1 |

The data in Table II further illustrates the freezing point depression of the compositions and the antifreeze properties of some of the compositions.

Example 2. Several corrosion tests were carried out using a sodium double salt of this invention and conventional deicers. The first corrosion tests were conducted with #3 reinforcing bar tokens which were placed in 3 weight percent solutions of various deicers for 168 hours at room temperature. After completion of the test, the tokens were removed and examined for corrosion. The deicers evaluated were a sodium double salt of this invention (specifically the 1:1 NaA:NaF composition), sodium chloride, and CMA; one additional test used distilled water. All the comparative solutions (sodium chloride, CMA, and distilled water) caused significant corrosion. The sodium double salt did not caused significant corrosion.

Another corrosion test employed #3 reinforcing bar tokens imbedded in ASTM C109 mortar cubes which were vacuum saturated in a 10 weight percent solution of each composition employed in the first corrosion test. The cube samples were allowed to dry for one week and then placed in a moisture room at 23° C. for an additional week. This cycling was continued until cracks formed in some of the specimens. Half-cell readings were taken weekly at the end of each half of the cycle and correlated extremely well with the observed corrosion of the reinforcing steel specimens. After about 20 cycles, the mortar cubes were broken to visually observe the condition of the steel tokens. The samples soaked with distilled water and those soaked with the sodium double salt of this invention did not exhibit any active corrosion half-cell potentials; visual inspection confirmed the lack of corrosion (i.e., no visible rust). Both the sodium chloride soaked sample and CMA-soaked sample had half-cell potentials in excess of −350 mV after the wet portion of the cycle; upon visual inspection, the reinforcing steel in these specimens was found to be severely corroded.

Using the same procedures as described directly above, another set of #3 reinforcing bar tokens imbedded in ASTM C109 mortar cubes were vacuum saturated in a 10 weight percent aqueous solution of the 1:1 NaA-NaF composition. After two dry-wet cycles (also as described directly above), the maximum half-cell values obtained were about −200 mV; these observed values were well below the corrosion threshold of steel in concrete (i.e. about −350 mV). These tests once again confirmed the non-corrosive nature of the 1:1 NaA:NaF double salt compositions.

Example 3. A 1:1 NaA:NaF double salt was prepared in essentially the same manner as described in Example 1 (Part A). X-ray diffraction data was obtained on crystals of the 1:1 NaA:NaF compound as well as comparative data on crystals of sodium acetate and sodium formate. Data for the ten most intense lines in the X-ray diffraction pattern for the three compounds is given below in Table III. Intensity data ("Int.") is presented as relative intensity and lattice spacing data ("D") is given in Angstroms.

TABLE III

| Sodium Acetate | | Sodium Formate | | 1:1 NaA:NaF | |
|---|---|---|---|---|---|
| Int. | D (Å) | Int. | D (Å) | Int. | D (Å) |
| 100 | 10.1139 | 99 | 3.3783 | 100 | 10.2178 |
| 26 | 2.5226 | 31 | 1.8577 | 26 | 9.782 |
| 14 | 3.1741 | 16 | 2.6361 | 14 | 2.9275 |
| 12 | 2.3451 | 15 | 2.0943 | 12 | 8.2034 |
| 6 | 3.3639 | 7 | 4.3364 | 6 | 2.9449 |
| 2 | 5.0484 | 6 | 1.4222 | 2 | 17.7731 |
| 2 | 3.3166 | 4 | 2.7794 | 2 | 4.3379 |
| 1 | 3.0053 | 2 | 2.142 | 1 | 2.6464 |
| 1 | 3.7193 | 2 | 1.5518 | 1 | 3.3888 |
| 1 | 7.8021 | 2 | 2.887 | 1 | 2.6645 |

The X-ray diffraction data in Table III clearly shows that the 1:1 sodium double salt is different from either sodium acetate or sodium formate and supports the existence of the 1:1 sodium double salt as a unique ionic compound. For example, 1:1 NaA:NaF has strong lines at D values 9,782, 8.2034, and 17.7731 which are not present in the X-ray diffraction patterns for sodium acetate and sodium formate.

Example 4. Several sodium double salts were prepared in essentially the same manner as described in Example 1 (Part A). Fourier transform infra-red (FTIR) spectra were obtained on the sodium double salts and, for comparison purposes, sodium acetate and sodium formate. The sodium double salts examined included 1:4 NaA:NaF, 1:1 NaA:NaF, and 4:1 NaA:-

NaF. In the formate C-H stretching region (about 2900 to 2600 cm$^{-1}$), the following data was obtained:
NaF 2830 (S), 2716 (S) cm$^{-1}$
4:1 NaA:NaF 2830 (s), 2787 (s), 2710 (b) cm$^{-1}$
1:1 NaA:NaF 2790 (s), 2702 (s) cm$^{-1}$
1:4 NaA:NaF 2787 (s), 2704 (w,b) cm$^{-1}$
NaA no absorption bands
In the C-H bending region (about 1500 to 1300 cm$^{-1}$), the following data was obtained:
NaF 1361 (S) cm$^{-1}$
4:1 NaA:NaF 1416 (b,w), 1364 (s) cm$^{-1}$
1:1 NaA:NaF 1433 (b), 1371 (m) cm$^{-1}$
1:4 NaA:NaF 1444 & 1416 (vb,unsy), 1368 (w) cm$^{-1}$
NaA 1483 & 1419 (vb, unsy)
In the above date, absorption bands were classified on a relative basis using the following notation: s=strong and sharp; b=broad; vb=very broad; m=moderate; w=weak; and unsy=unsymmetrical. All absorption bands, unless indicated otherwise, were symmetric.

This FTIR data also supports the formation of double salts rather than simple mixtures of sodium formate and sodium acetate. For example, the 1:1 NaA:NaF compound shows a substantial shift to lower wavenumbers (i.e., 2790 and 2702 cm$^{-1}$) relative to sodium formate and symmetrical absorption bands. And in the C-H bending region, the two broad and unsymmetrical bands centered around about 1420 cm$^{-1}$ for sodium acetate disappear and are replaced by a single, symmetrical band at 1433 cm$^{-1}$ in the 1:1 NaA:NaF compound.

Example 5. This example illustrates the preparation of a mixed cation double salt deicer. Formic acid (52.3 g, 1.0 mole; 88% solution) and acetic acid (60.0 g, 1.0 mole; glacial) were mixed with 100 ml water. Calcium hydroxide (37.0 g, 0.5 mole; analytical reagent grade) was added to the aqueous carboxylic acid mixture with stirring. Sodium hydroxide (40.0 g, 1.0 mole; analytical reagent grade) was dissolved in 20 ml water and then added to the aqueous carboxylic acid mixture. The pH was adjusted to a value of about 9 with a few drops of a 1N NaOH solution. About 20 ml of additional water was added to eliminate the cloudy appearance and insure a uniform solution. This solution was then dried under vacuum. A white, odorless, stable, crystalline product was obtained. This mixed cation double salt is an excellent deicer composition.

Example 6. This example illustrates the use of a double salt (1:1 NaA:NaF prepared in essentially the same manner as Example 1 (Part A)) as an anti-icer. Anti-icing involves the pre-application of a deicer to pavement, bridge deck, or like surface in order to weaken the bond between the surface and any later accumulating ice or snow (i.e., reduce the bond strength between the surface and ice or snow formed thereon). Anti-icing characteristics were measured by treating a portland cement concrete substrate with various deicers and then determining the shear strength necessary to remove ice from the surface. Substrate surfaces were treated with the various deicers at various application rates and allowed to dry. Ice samples enclosed within a teflon ring were then frozen onto the substrates in an environmental chamber at −10° C. (about 14° F.) and equilibrated for four hours. The teflon ring had a central groove to allow attachment of a cable. Shear strength was measured using a tensile tester attached to the ring through a cable. Substrates were thoroughly cleaned between tests to remove residual deicers. The results are shown below in Table IV.

TABLE IV

| Application Rate (lbs/lane mile) | Shear Strength (PSI) | | | | |
|---|---|---|---|---|---|
| | 1:1 NaA:NaF | NaCl | CaCl$_2$ | NaA | NaF |
| 0 (control) | 107.2 | 107.2 | 107.2 | 107.2 | 107.2 |
| 50 | 75.0 | 105.3 | 101.1 | 96.9 | 76.2 |
| 100 | 70.5 | 88.8 | 107.0 | 66.0 | 82.8 |
| 150 | 60.6 | 98.9 | 109.7 | 98.3 | 71.7 |
| 200 | 46.2 | 97.7 | 101.9 | 86.1 | 68.4 |
| 250 | 32.0 | 85.5 | 101.3 | — | — |

The control (bare concrete without deicer) and the samples using NaCl, CaCl$_2$, sodium acetate, and sodium formate are included for comparison purposes only. The data in Table IV clearly show that the deicing compositions of this invention can act as effective anti-icers. The anti-icing compositions of this invention can, even at relatively low application rates, significantly reduce the bond strength between a concrete surface and ice formed on that surface. The anti-icing effect increases with increasing application rates. Removal of ice and snow from a roadway or similar surface which has been treated with the anti-icing compositions of this invention should be significantly easier, and perhaps even more complete, as compared to an untreated surface.

That which is claimed is:

1. A deicing composition comprising a crystalline double salt formed by (1) neutralizing an aqueous mixture of at least two organic carboxylic acids containing from 1 to 3 carbon atoms or salts thereof with a neutralizing agent, wherein said neutralizing agent contains sodium cations or sodium cations and at least one cation selected from the group consisting of potassium, calcium and magnesium, (2) adjusting the pH of the neutralized aqueous mixture to about 7 to 10 with a pH adjusting agent, wherein said pH adjusting agent contains sodium cations or sodium cations and at least one cation selected from the group consisting of potassium, calcium and magnesium, and (3) removing the water from the pH-adjusted aqueous mixture to obtain the crystalline double salt, wherein the aqueous mixture of at least two carboxylic acids contains formic acid and acetic acid, or salts thereof, such that the molar ratio of acetic acid to formic acid, or salts thereof, is in the range of about 1:4 to 4:1 and wherein said double salt contains sodium cations or sodium cations and at least one cation selected from the group consisting of potassium, calcium, and magnesium.

2. A deicing composition as defined in claim 1, wherein the aqueous mixture of at least two carboxylic acids contains an additional organic carboxylic acid selected from the group consisting of glycolic acid, lactic acid, salts thereof, and mixtures thereof and wherein the deicing composition has ice penetration capacity at least equivalent to sodium chloride and an eutectic temperature of less than about −20° C.

3. A deicing composition as defined in claim 1, wherein the neutralization agent is selected from the group consisting of sodium carbonate, sodium hydroxide, and mixtures thereof.

4. A deicing composition as defined in claim 3, wherein the neutralization agent further contains at least one additional material selected from the group consisting of potassium hydroxide, potassium carbonate, magnesium carbonate, magnesium hydroxide, calcium carbonate, and calcium hydroxide.

5. A deicing composition am defined in claim 3, wherein the molar ratio of acetic acid to formic acid, or salts thereof, is in the range of about 1:2 to 2:1.

6. A deicing composition as defined in claim 4, wherein the molar ratio of acetic acid to formic acid, or salts thereof, is in the range of about 1:2 to 2:1.

7. A deicing composition as defined in claim 5, wherein the molar ratio of acetic acid to formic acid, or salts thereof, is about 1:1.

8. A deicing composition as defined in claim 6, wherein the molar ratio of acetic acid to formic acid, or salts thereof, is about 1:1.

9. A deicing composition as defined in claim 1, wherein the pH of the neutralized aqueous mixture is adjusted to about 9.

10. A deicing composition as defined in claim 5, wherein the pH of the neutralized aqueous mixture is adjusted to about 9.

11. A deicing composition as defined in claim 6, wherein the pH of the neutralized aqueous mixture is adjusted to about 9.

12. A method for deicing ice- or snow-covered structures, said method comprising applying an effective amount of a deicing composition to the structure to be deiced, wherein the deicing composition comprises a crystalline double salt formed by (1) neutralizing an aqueous mixture containing acetic acid and formic acid, or salts thereof, with a neutralizing agent, wherein said neutralizing agent contains sodium cations or sodium cations and at least one cation selected from the group consisting of potassium, calcium and magnesium, (2) adjusting the pH of the neutralized aqueous mixture to about 7 to 10 with a pH adjusting agent, wherein said pH adjusting agent contains sodium cations or sodium cations and at least one cation selected from the group consisting of potassium, calcium and magnesium, and (3) removing the water from the pH-adjusted aqueous mixture to obtain the crystalline double salt, wherein the molar ratio of acetic acid to formic acid, or salts thereof, in the aqueous mixture is in the range of about 1:4 to 4:1 and wherein said double salt contains sodium cations or sodium cations and at least one cation selected from the group consisting of potassium, calcium, and magnesium.

13. A deicing method as defined in claim 12, wherein the deicing composition has ice penetration capacity at least equivalent to sodium chloride and an eutectic temperature of less than about −20° C., and wherein the average particle size of the crystalline double salt is about 1 to 12.5 mm.

14. A deicing method as defined in claim 13, wherein the neutralization agent is selected from the group consisting of sodium carbonate, sodium hydroxide, and mixtures thereof.

15. A deicing method as defined in claim 14, wherein the neutralization agent further contains at least one additional material selected from the group consisting of potassium hydroxide, potassium carbonate, magnesium carbonate, magnesium hydroxide, calcium carbonate, and calcium hydroxide.

16. A deicing method as defined in claim 14, wherein the molar ratio of acetic acid to formic acid, or salts thereof, is in the range of about 1:2 to 2:1.

17. A deicing method as defined in claim 15, wherein the molar ratio of acetic acid to formic acid, or salts thereof, is in the range of about 1:2 to 2:1.

18. A deicing method as defined in claim 16, wherein the molar ratio of acetic acid to formic acid, or salts thereof, is about 1:1.

19. A deicing method as defined in claim 17, wherein the molar ratio of acetic acid to formic acid, or salts thereof, is about 1:1.

20. A deicing method as defined in claim 16, wherein the pH of the neutralized aqueous mixture is adjusted to about 9.

21. A deicing method as defined in claim 17, wherein the pH of the neutralized aqueous mixture is adjusted to about 9.

22. A deicing composition comprising a crystalline sodium double salt of general formula

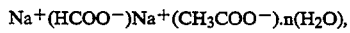

$$Na^+(HCOO^-)Na^+(CH_3COO^-)\cdot n(H_2O),$$

where n equals 0 to 5.

23. A deicing composition as defined in claim 22, wherein the average particle size of the crystalline double salt is about 1 to 12.5 mm.

24. A deicing composition as defined in claim 23, wherein the average particle size of the crystalline double salt is about 2 to 9 mm.

25. A method for treating structures selected from the group consisting of highways, bridges, and sidewalks whereby the strength of the bond between the surface of the structure and later accumulated ice or snow on the surface is reduced, said method comprising applying an effective anti-icing amount of a composition to the surface of the structure to be treated, wherein the composition comprises a crystalline double salt or an aqueous solution thereof, wherein the crystalline double salt is formed by (1) neutralizing an aqueous mixture containing formic acid and acetic acid, or salts thereof, with a neutralizing agent, wherein said neutralizing agent contains sodium cations or sodium cations and at least one cation selected from the group consisting of potassium, calcium and magnesium, (2) adjusting the pH of the neutralized aqueous mixture to about 7 to 10 with a pH adjusting agent, wherein said pH adjusting agent contains sodium cations or sodium cations and at least one cation selected from the group consisting of potassium, calcium and magnesium, and (3) removing the water from the pH-adjusted aqueous mixture to obtain the crystalline double salt, wherein the molar ratio of acetic acid to formic acid, or salts thereof, in the aqueous mixture is in the range of about 1:4 to 4:1 and wherein said double salt contains sodium cations or sodium cations and at least one cation selected from the group consisting of potassium, calcium, and magnesium.

26. A method as defined in claim 25, wherein the deicing composition has ice penetration capacity at least equivalent to sodium chloride and an eutectic temperature of less than about −20° C., and wherein the average particle size of the crystalline double salt is about 1 to 12.5 mm.

27. A method as defined in claim 26, wherein the neutralization agent is selected from the group consisting of sodium carbonate, sodium hydroxide, and mixtures thereof.

28. A method as defined in claim 27, wherein the neutralization agent further contains at least one additional material selected from the group consisting of potassium hydroxide, potassium carbonate, magnesium carbonate, magnesium hydroxide, calcium carbonate, and calcium hydroxide.

29. A method as defined in claim 27, wherein the molar ratio of acetic acid to formic acid, or salts thereof, is in the range of about 1:2 to 2:1.

30. A method as defined in claim 28, wherein the molar ratio of acetic acid to formic acid, or salts thereof, is in the range of about 1:2 to 2:1.

31. A method as defined in claim 29, wherein the molar ratio of acetic acid to formic acid, or salts thereof, is about 1:1.

32. A method as defined in claim 30, wherein the molar ratio of acetic acid to formic acid, or salts thereof, is about 1:1.

33. A method as defined in claim 29, wherein the pH of the neutralized aqueous mixture is adjusted to about 9.

34. A method as defined in claim 30, wherein the pH of the neutralized aqueous mixture is adjusted to about 9.

35. A deicing composition comprising a crystalline double salt of general formula:

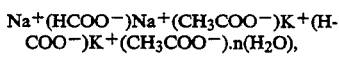
$$Na^+(HCOO^-)Na^+(CH_3COO^-)K^+(HCOO^-)K^+(CH_3COO^-)\cdot n(H_2O),$$

where n equals 0 to 5.

36. A deicing composition as defined in claim 35, wherein the average particle size of the crystalline double salt is about 1 to 12.5 mm.

37. A deicing composition comprising a crystalline double salt of general formula:

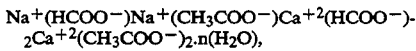
$$Na^+(HCOO^-)Na^+(CH_3COO^-)Ca^{+2}(HCOO^-)_2Ca^{+2}(CH_3COO^-)_2\cdot n(H_2O),$$

where n equals 0 to 5.

38. A deicing composition as defined in claim 37, wherein the average particle size of the crystalline double salt is about 1 to 12.5 mm.

39. A deicing composition comprising a crystalline double salt of general formula:

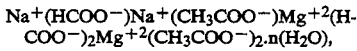
$$Na^+(HCOO^-)Na^+(CH_3COO^-)Mg^{+2}(HCOO^-)_2Mg^{+2}(CH_3COO^-)_2\cdot n(H_2O),$$

where n equals 0 to 5.

40. A deicing composition as defined in claim 39, wherein the average particle size of the crystalline double salt is about 1 to 12.5 mm.

41. A deicing composition formed by (1) neutralizing with a neutralization agent wherein said neutralizing agent contains sodium cations or sodium cations and at least one cation selected from the group consisting of potassium, calcium and magnesium, an aqueous mixture containing formic acid and acetic acid, or salts thereof, wherein the molar ratio of acetic acid to formic acid, or salts thereof, is in the range of about 1:4 to 4:1, (2) adjusting the pH of the neutralized aqueous mixture no about 7 to 10 with a pH adjusting agent, wherein the pH adjusting agent contains sodium cations or sodium cations and at least one cation selected from the group consisting of potassium, calcium, and magnesium, and (3) removing the water from the pH-adjusted aqueous mixture to obtain the deicing composition.

42. A deicing composition as defined in claim 41, wherein the aqueous mixture containing formic acid and acetic acid contains an additional organic carboxylic acid selected from the group consisting of glycolic acid, lactic acid, salts thereof, and mixtures thereof and wherein the deicing composition has ice penetration capacity at least equivalent to sodium chloride and an eutectic temperature of less than about $-20°$ C.

43. A deicing composition as defined in claim 41, wherein the neutralization agent is selected from the group consisting of sodium carbonate, sodium hydroxide, and mixtures thereof.

44. A deicing composition as defined in claim 43, wherein the neutralization agent further contains at least one additional material selected from the group consisting of potassium hydroxide, potassium carbonate, magnesium carbonate, magnesium hydroxide, calcium carbonate, and calcium hydroxide.

45. A deicing composition as defined in claim 43, wherein the molar ratio of acetic acid to formic acid, or salts thereof, is in the range of about 1:2 to 2:1.

46. A deicing composition as defined in claim 44, wherein the molar ratio of acetic acid to formic acid, or salts thereof, is in the range of about 1:2 to 2:1.

* * * * *